Figures 1, 7:
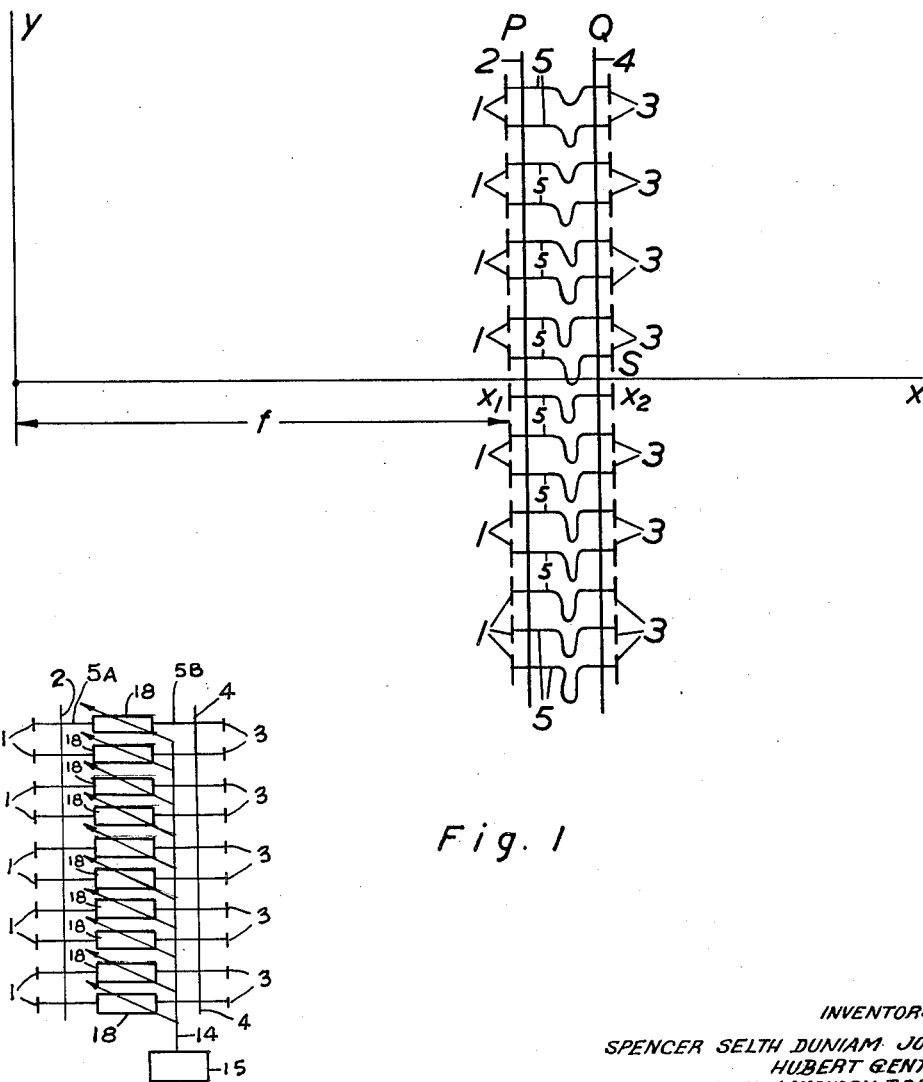

May 30, 1961    S. S. D. JONES ET AL    2,986,734
ELECTROMAGNETIC WAVE LENS AND MIRROR SYSTEMS
Filed July 2, 1958    5 Sheets-Sheet 1

INVENTORS
SPENCER SELTH DUNIAM JONES
HUBERT GENT
ADRIAN ANTHONY LANGHORN BROWNE
By Harry M. Saragovitz
Attorney May 30, 1961  S. S. D. JONES ET AL  2,986,734
ELECTROMAGNETIC WAVE LENS AND MIRROR SYSTEMS
Filed July 2, 1958  5 Sheets-Sheet 4

INVENTORS
SPENCER SELTH DUNIAM JONES
HUBERT GENT
ADRIAN ANTHONY LANGHORN BROWNE
By
Harry M. Saragovitz
Attorney May 30, 1961  S. S. D. JONES ET AL  2,986,734
ELECTROMAGNETIC WAVE LENS AND MIRROR SYSTEMS
Filed July 2, 1958  5 Sheets-Sheet 5

INVENTORS
SPENCER SELTH DUNIAM JONES
HUBERT GENT
ADRIAN ANTHONY LANGHORN BROWNE
By
Harry M. Saragovitz
Attorney United States Patent Office 2,986,734
Patented May 30, 1961

2,986,734
ELECTROMAGNETIC WAVE LENS AND
MIRROR SYSTEMS
Spencer Selth Duniam Jones, Malvern, and Hubert Gent,
North Malvern, England, and Adrian Anthony Langhorn Browne, Ottawa, Ontario, Canada, assignors to
Minister of Supply, Strand, London, England
Filed July 2, 1958, Ser. No. 746,255
1 Claim. (Cl. 343—754)

The present invention relates to electromagnetic wave lens systems, and has for its primary object to provide a radiating lens system for producing a particular beam scanning pattern.

Electromagnetic lens system of the type utilizing this invention consist of a plurality of receiving antennas arranged in a particular configuration coupled to corresponding transmitting antenna in a manner to produce a desired wave form configuration.

The present invention provides means for producing a scanning pattern in electromagnetic lens system of the type that exhibits the properties of optical lens such as the ability to focus and form images by utilizing a plurality of conduits, for example waveguides or transmission lines, arranged to change the shape of a wave front by accepting the wave energy at points lying in one line or surface and radiating the energy from corresponding points lying in another line or surface.

Briefly stated, the present invention accomplishes the desirable scanning pattern by introducing a particular phase shift between each receiving and corresponding transmitting antenna and having the phase shifters interrelated to each other in such a manner that the particular scanning pattern is produced.

According to the invention in one aspect an electromagnetic wave lens comprises a first and a second assembly of aerial elements in spaced relationship and arranged so that negligible free-space transmission takes place between the elements of the assemblies whereby each assembly defines a lens surface which can absorb or emit radiation accordingly as its elements are parasitically or actively excited, and transmission lines connecting elements of the first assembly with elements of the second, the configurations of the first and second lens surfaces, the element-to-element correspondence on the two surfaces, and the electrical lengths of the transmission line paths formed between corresponding elements of the first and second assemblies being chosen to obtain desired lens characteristics.

One arrangement of an assembly of aerial elements which can be used conveniently, for instance at microwavelengths, is that in which a number of dipole elements are disposed before a reflecting surface, transmission lines then extending through, and between, the reflecting surfaces to connect the dipole elements.

Alternatively the aerial assemblies may each comprise an array of slots cut in a conducting surface and disposed before a reflecting screen approximately a quarter-wavelength away. The transmission lines are then connected between the feed points of corresponding slots.

For some longer wavelengths the assemblies of aerial elements may each comprise a curtain of dipole elements suspended before a reflecting curtain, the reflecting curtains ensuring that there is negligible direct free-space radiation between the elements of the first and second assemblies.

Preferably the aerial elements are matched to the interconnecting transmission lines.

It will be seen that the characteristics of a lens according to the invention can be varied very simply by the adjustment of the electrical length of the transmission lines and/or insertion in the transmission lines of different phase determining elements according to the desired characteristics; and similarly by the use of means to vary the electrical length of the transmission lines in a predetermined manner a scanning lens can be provided, that is, a lens which can, electrically and without moving itself, produce a scanning beam of radiation.

Another form of scanning or directioned lens can be provided in which the transmission lines allow mechanical movement of one lens surface relative to the other.

Figure 2:
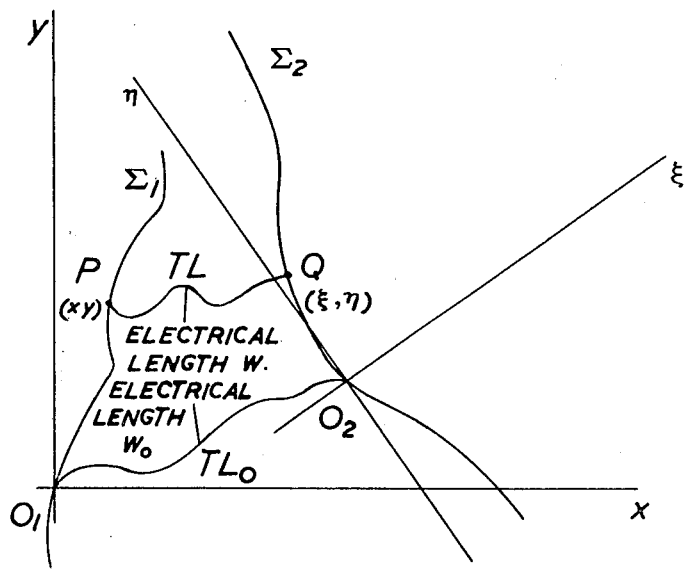
Figure 3:
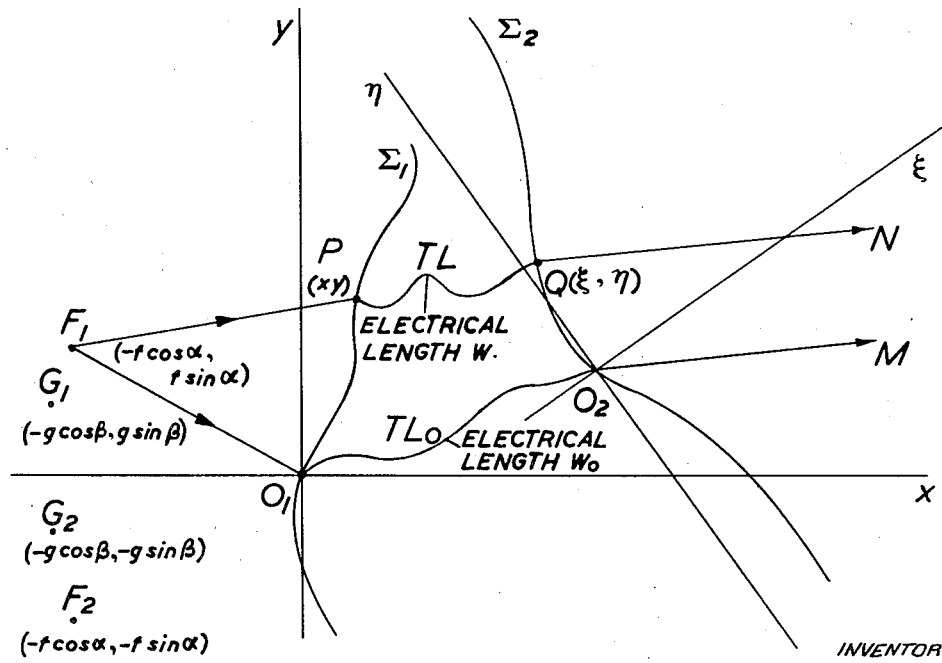
Figure 4:
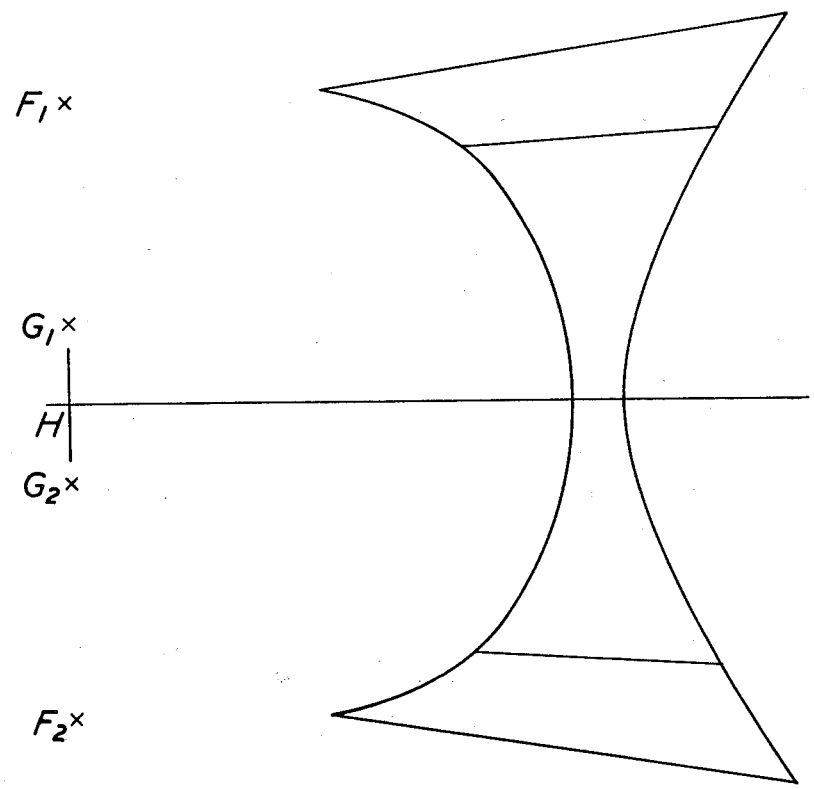
Figure 5:
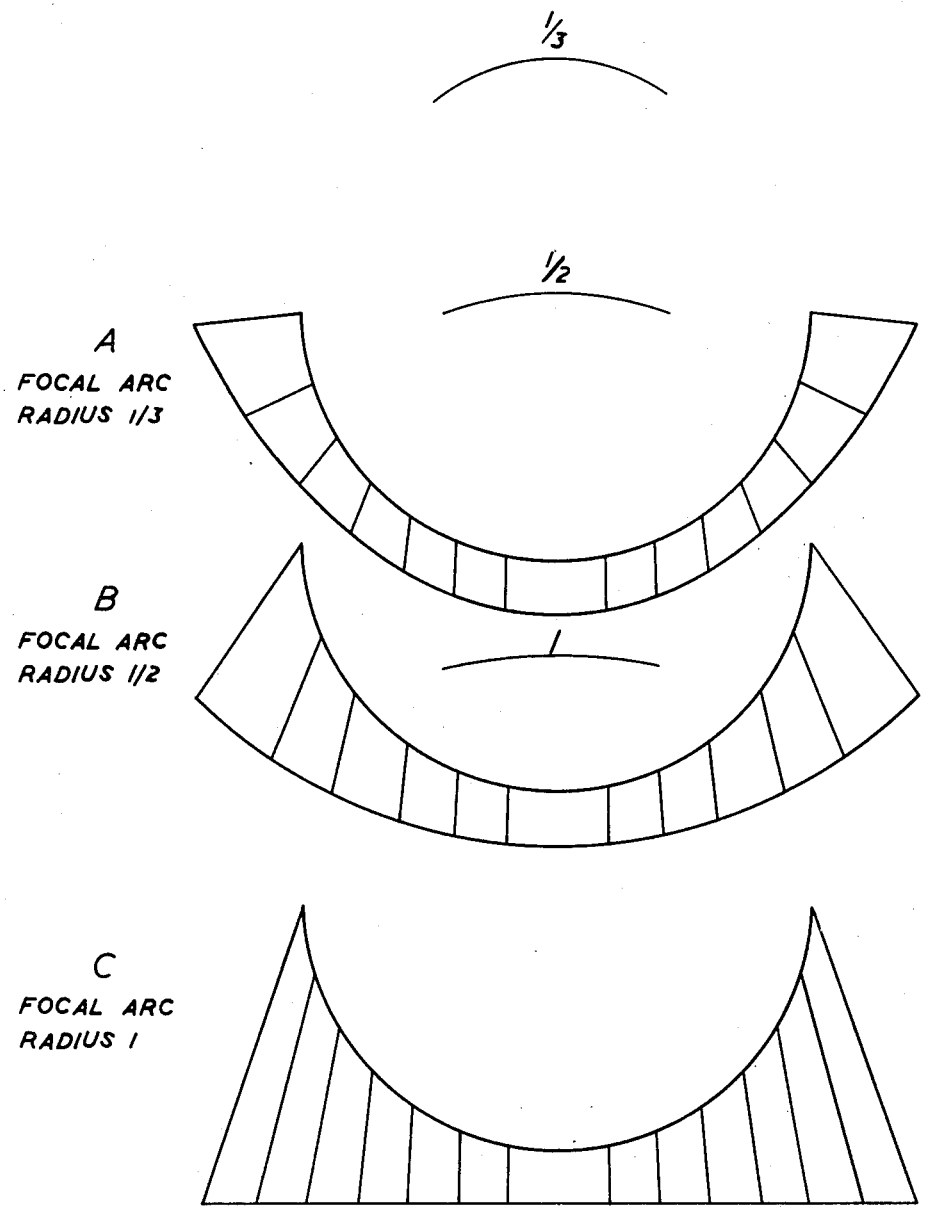
Figure 6:
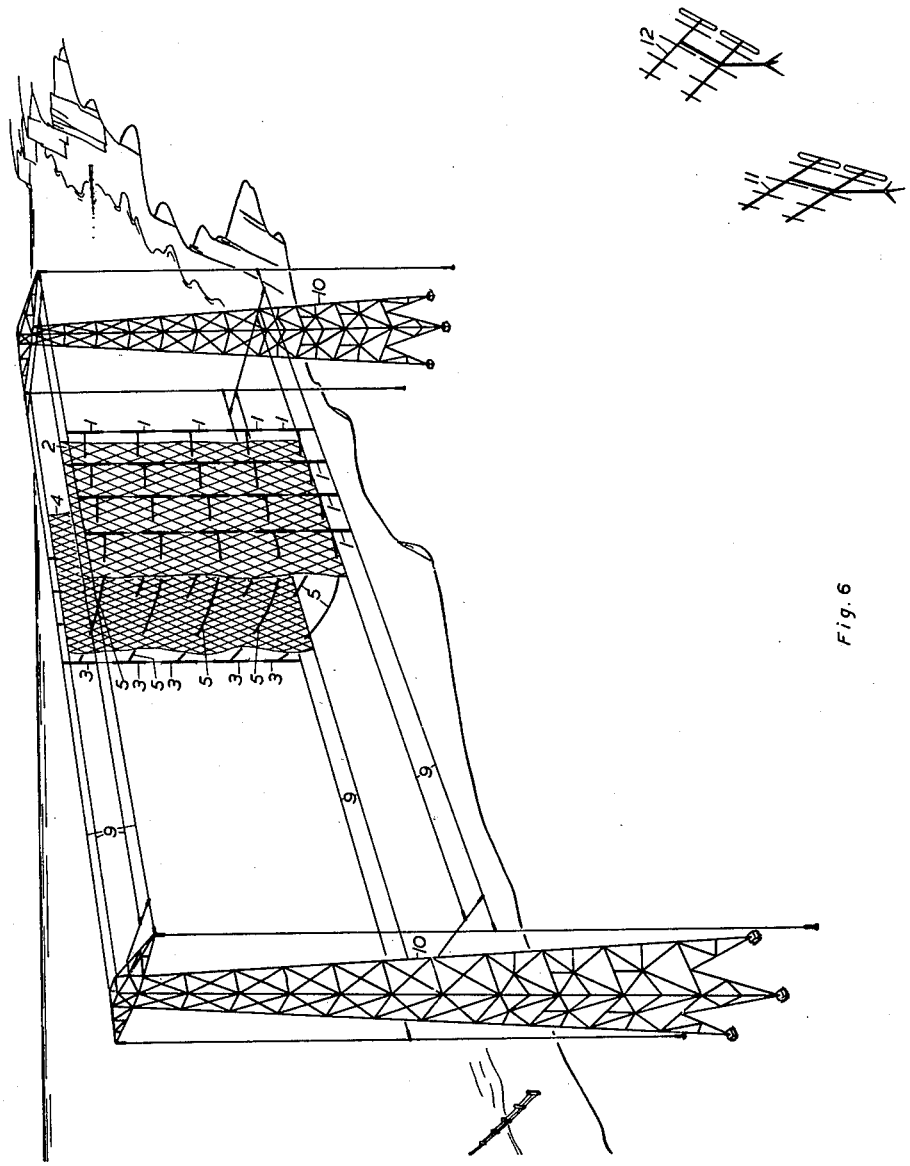

In order to make the invention clearer a discussion of the principles involved will now be given together with examples of lenses according to the invention, one example being a lens as applied to VHF forward-scatter propagation. Reference will be made to the accompanying drawings, in which:

Figure 1 shows diagrammatically a section through the known fixed electromagnetic lens system of the general type to be scanned by the inclusion of the present invention, Figures 2 and 3 show diagrams illustrating the general type of lens, Figure 4 shows a lens having four focal points in a straight line, Figures 5A, B and C show diagrammatically examples of four coincident foci lenses, Figure 6 shows an example of a lens for use in a VHF forward scatter propagation aerial system, Figure 7 shows schematically the scanning lens system according to the invention.

Figure 1 shows a section through a lens of known type having two plane effective surfaces. The lens comprises a plane array of dipole aerial elements 1 spaced approximately a quarter wavelength from a reflector 2; a second plane array of dipole elements 3 is located a quarter wavelength in front of a reflector 4.

The lens is of focal length $f$ measured along the axis $Ox$ which lies normally to the surfaces of the arrays of the lens. Each dipole element 1 of the first array is connected via a transmission line 5 to a corresponding dipole element 3 of the second array; the transmission line 5 passes through a small hole in the reflectors 2 and 4.

In the diagrammatic form of Fig. 1 the lens is considered two dimensionally, i.e. the action of the lens is here considered only in the $xy$ plane. This corresponds in practice to the use of a cylindrical lens system with a long linear array or cheese feed. A three-dimensional analysis is equally possible however but for simplicity is not considered here in detail.

In the lens having two plane effective surfaces the electrical lengths of the transmission lines 5 and the correspondence between dipole elements 1 and 3 are chosen to give desired characteristics to the lens as a whole. The lens design can well be considered more generally and this will be done with reference to Fig. 2.

In Fig. 2 the lens surfaces are shown two-dimensionally in general form by the cross-sections $\Sigma_1$ and $\Sigma_2$. The surfaces of the lens are defined by aerial elements in the surfaces $\Sigma_1$ and $\Sigma_2$, each element along the surface $\Sigma_1$ being connected to a corresponding element in the surface $\Sigma_2$ by a transmission line TL. The surface $\Sigma_1$ is defined with reference to coordinate axes $O_1x$, $O_1y$ where, without loss of generality, $O_1$ is a point on $\Sigma_1$. Similarly the surface $\Sigma_2$ is defined with reference to coordinate axes $O_2\xi$, $O_2\eta$ where, without loss of generality, $O_2$ is the point on $\Sigma_2$ corresponding to the point $O_1$ on $\Sigma_1$: the aerial element at $O_2$ is connected to the aerial element at $O_1$ by a transmission line $TL_0$ of elecrical length $W_o$. The axes $O_2\xi$, $O_2\eta$ need have no fixed relation to the axes $O_1x$, $O_1y$ since the operation of the lens is not affected by moving the surface $\Sigma_2$ relative to the surface $\Sigma_1$ as long as the transmission line lengths are unaltered. It is noted that movement of the surface $\Sigma_2$ provides one means of scanning a beam from the lens. The point P, having coordinates $(x, y)$, is a typical aerial element in $\Sigma_1$, being connected to Q, a typical element in $\Sigma_2$ having coordinates $(\xi, \eta)$, by the transmission line TL of electrical length W. There is assumed to be no phase-discontinuity at the surfaces, and the transmission lines are taken to be non-dispersive with a quasi-refractive index N. ("Quasi-refractive-index" is defined as the ratio of velocity of propagation in free-space to that in the line: i.e. the physical length of a line is $W/N$, where W is the electrical length of the line.)

Now if $y$ is taken as the independent variable in designing the lens, then for each value of $y$ between minus infinity and plus infinity the values of the four quantities $x$, $\xi$, $\eta$ and W can be chosen at will; thus in the two-dimensional case the lens has four degrees of freedom. Other types of lenses have at least one less degree of freedom, for example the parallel plate lens of Ruze has $\eta=y$, leaving only the three quantities $x$, $\xi$ and W to be chosen at will.

It should be noted that the spacing between the aerial elements of a lens surface is chosen to ensure continuity across a radiation beam and to avoid mismatch of the lens surfaces; conveniently it is made less than one wavelength to reduce the possibility of secondary beams occurring.

In general it could be stated that ideally, a lens surface should, if its transmission lines are terminated by matched loads, act as a perfect absorber of radiation.

As an example of the way in which the four degrees of freedom may be utilised in lens design, we give the calculation for a lens of this type having four points of perfect focus; this will be done with reference to Fig. 3.

Fig. 3 is similar to Fig. 2 except that we have added the four focal points $F_1$, $G_1$, $G_2$, $F_2$ having coordinates $(-f \cos \alpha, f \sin \alpha)$, $(-g \cos \beta, g \sin \beta)$, $(-g \cos \beta, g \sin \beta)$ and $(-f \cos \alpha, -f \sin \alpha)$ respectively with respect to the $x-y$ axes. Using the concepts and terminology of geometrical optics (as is often done in the design of electromagnetic wave lenses), $F_1O_1O_2M$ represents a ray through the lens at the origin and $F_1PQN$ represents any other typical ray.

We now design the lens so that the four focal points $F_1$, $G_1$, $G_2$, $F_2$ give perfectly collimated beams of radiation at angles to the axis $O\xi$ of $-\alpha$, $-\beta$, $+\beta$ and $+\alpha$ respectively.

The optical path-length conditions for path-length equality between any ray and the ray through the origin are:

$$F_1X + W - \xi \cos \alpha + \eta \sin \alpha = f + Wo \quad (1)$$
$$G_1X + W - \xi \cos \beta + \eta \sin \beta = g + Wo \quad (2)$$
$$G_2X + W - \xi \cos \beta - \eta \sin \beta = g + Wo \quad (3)$$
$$F_2X + W - \xi \cos \alpha - \eta \sin \alpha = f + Wo \quad (4)$$

where $$(F_1X)^2 = f^2 + x^2 + y^2 + 2fx \cos \alpha - 2fy \sin \alpha \quad (1a)$$
$$(G_1X)^2 = g^2 + x^2 + y^2 + 2gx \cos \beta - 2gy \sin \beta \quad (2a)$$
$$(G_2X)^2 = g^2 + x^2 + y^2 + 2gx \cos \beta + 2gy \sin \beta \quad (3a)$$
$$(F_2X)^2 = f^2 + x^2 + y^2 + 2fx \cos \alpha + 2fy \sin \alpha \quad (4a)$$

Taking $y$ as the independent variable, the four Equations 1, 2, 3, 4 give the required values of the four quantities $x$, $\xi$, $\eta$, W, for each value of $y$ between minus infinity and plus infinity.

Subtracting (1) from (4) and (2) from (3) and dividing gives $$(F_2X - F_1X)/(2 \sin \alpha) = (G_2X - G_1X)/(2 \sin \beta) \quad (5)$$

which is the relation between $x$ and $y$, i.e. the equation of the first lens surface $\Sigma_1$. Then the second lens surface $\Sigma_2$ is obtained from the equations $$\xi = \frac{(G_2X + G_1X - 2g) - (F_2X + F_1X - 2f)}{2(\cos \beta - \cos \alpha)} \quad (6)$$

$$\eta = (F_2X - F_1X)/(2 \sin \alpha) \quad (7)$$

and the electrical lengths of the transmission lines from the equation $$W = Wo + \frac{(G_2X - G_1X - 2g) \cos \alpha - (F_2X + F_1X - 2f) \cos \beta}{2(\cos \beta - \cos \alpha)} \quad (8)$$

The Equations 5, 6, 7 and 8 complete the design of the four-focal-point lens; a lens with its four focal points on a straight line, $\alpha = 30°$ and $\beta = 10°$ is shown in Fig. 4.

As a further example of lens design, suppose we let $\alpha$ and $\beta$ approach zero, and let $$\begin{aligned} f &= h(1 + \alpha^2) \\ G &= h(1 + \beta^2) \end{aligned} \quad (9)$$

so that the focal points $F_1$, $G_1$, $G_2$, $F_2$ lie on an arc of radius $h/(1-2\mu)$ passing through the point $(-h, O)$.

Then in the limit the first lens surface $\Sigma_1$ becomes $$y = [-x(h+x)]^{\frac{1}{2}} \quad (10)$$

which is a circle of radius $\frac{1}{2}h$ and centre $(-\frac{1}{2}h, O)$.

The second lens surface is given by $$\xi = 2\mu(h - [h(h+x)]^{\frac{1}{2}}) \quad (11)$$
$$= [-hx]^{\frac{1}{2}} \quad (12)$$

so that the equation connecting $\xi$ and $\eta$ is $$\xi = 2\mu(h - [h^2 - \eta^2]^{\frac{1}{2}}) \quad (13)$$

which is an ellipse of axes $2\mu h$, $h$ and centre $(2\mu h, O)$.

The electrical length of the transmission lines is given by $$W = Wo + (2\mu + 1)(h - [h^2 - \eta^2]^{\frac{1}{2}}) \quad (14)$$

We have thus completed the design of an infinite series of lenses each associated with one value of $\mu$, the radius of the focal arc in each case being $h/(1-2\mu)$ where $h$ is a constant. Since every lens has in effect four coincident focal points on its focal arc, they will possess good scanning properties.

Three examples of four coincident foci lenses are shown in Fig. 5 (A, B, C); the focal arc radii are $A = \frac{1}{3}$; $B = \frac{1}{2}$; $C = 1$.

An interesting special lens is that where $\mu = -\frac{1}{2}$, i.e. focal arc radius $\frac{1}{2}h$; this lens gives perfect collimation for all points on the focal circle. Also the equation for the electrical length of the transmission lines is $$W = Wo \quad (15)$$

so that the transmission lines are of constant length. This is of advantage for manufacture, and by choosing Wo to be a multiple of half a wavelength the surface mismatches can be cancelled against each other over the whole lens at once. Another advantage of this particular lens design is that the distance between aerial elements on the first lens surface is equal to the distance between elements on the second lens surface which is a circle of radius $h$: this property also confers advantages in manufacture.

Returning to the general lens case, the four degrees of freedom can clearly be used in other ways than providing four focal points, for example a two focal point lens where the amplitude and phase pattern across the two emergent beams are specified arbitrarily may be designed.

If it is desired to step the lens, as is often done with electromagnetic wave lenses, steps merely take the form of discontinuities in the progressive change in transmission line length, each discontinuity being a whole number of wavelengths in the electrical length of the transmission line. Introduction of stepping implies frequency dependence so that the bandwidth of a stepped lens will be less than that of an unstepped lens; though the total length of transmission line used can be reduced by stepping.

For an unstepped lens with non-dispersive transmission line, i.e. transmission line whose quasi-refractive-index is independent of frequency, such as coaxial line, twin-wire line or strip line, the bandwidth of the lens is determined only by the bandwidth of the elements employed, which may be made large. Further, the position of the focal points does not vary with frequency.

Alternatively the lens system may be used equivalently to a mirror by using only one set of aerial elements on a surface $\Sigma_1$ and short-circuiting the transmission lines at chosen distances from the elements. In this case the radiated beam re-emerges from the surface $\Sigma_1$ but with a controlled phase shift. Referring to the previous discussion we have effectively in this case $\xi = x$ and $\eta = y$ but retain the two degrees of freedom associated with $x$ and $W$, i.e. one more degree of freedom than in a conventional mirror. This new mirror may therefore be used to give two points of perfect focus, or to give a perfectly collimated mirror satisfying the Abbé scanning condition; its advantage is that only half the number of aerial elements would be required compared with the two-surface lens.

Attenuators placed in the transmission lines would enable further amplitude control over the width of the emergent beams at the expense of loss of power; dummy loads in the transmission lines would, of course, give a surface absorbing incident radiation over the bandwidth of the aerial elements.

Attenuators may also be used in the two surface lens to give a further degree of amplitude control at the expense of loss of power or efficiency: alternatively amplifiers could be inserted in the transmission lines to give an active lens of high power output without requiring high power density in the feeding means.

Fig. 6 shows an example of a lens as applied to forward-scatter propagation systems. A curtain of dipoles 1 is suspended in front of a mesh reflector 2 and a second curtain of dipoles 3 is suspended behind a second mesh reflector 4. The dipole lattice spacing is, of course, somewhat less than one wavelength to reduce secondary beams. The curtains of dipoles 1 and 3 and the mesh reflectors 2 and 4 are arrayed by means of suspender wires 9 which are tensioned between two towers 10. Transmission lines 5 passing through the mesh reflectors 2 and 4 connect the dipoles 1 with the dipoles 3.

The electrical lengths of the transmission lines 5 and the correspondence between dipoles 1 and 3 are chosen so as to give the required radiation pattern by following the principles enunciated above.

The lens is fed by means of Yagi aerial sources 11 and 12 located in the focal surface at a distance from the array.

Such an arrangement produces two beams of radiation, one originating at the source 11 and one at the source 12.

It will be appreciated that some adjustment of the direction of the beams can be effected quite simply by adjustment of the positions of the sources 11, 12. The arrangement shown is for use in a VHF forward scatter propagation system working on a wavelength of the order of 4–10 metres.

The scanning lens according to the invention is shown schematically in Figure 7 where the dipole aerial elements 1 and 3 are spaced from reflectors 2 and 4 respectively and connected by transmission line 5A and 5B to respective phase shifters 18. The phase shifters 18 are mechanically coupled together by shaft 14 which are driven by power source 15. The directive properties of the resulting lens can be charged by relative adjustment of the phase shifter 13 to produce the desired scanning property.

We claim:

An electromagnetic wave scanning lens comprising a first co-planar lattice array of dipole antennas disposed at substantially equally spaced points, first reflector means spaced a quarter wavelength from said first co-planar lattice array, a second co-planar lattice array of dipole antennas disposed at substantially equally spaced points, second reflector means spaced a quarter wavelength from said second co-planar lattice array, coupling means for electrically connecting each dipole antenna in said first array to a corresponding antenna in said second array, variable phase shifting means included in each coupling means and mechanically coupled to each other for varying the directional properties of said lens.

References Cited in the file of this patent
UNITED STATES PATENTS

| | | |
|---|---|---|
| 2,268,844 | Polkinghorn | Jan. 6, 1942 |
| 2,367,764 | Ferris | Jan. 23, 1945 |
| 2,566,703 | Jams | Sept. 4, 1951 |
| 2,663,848 | Lewis | Dec. 22, 1953 |